Oct. 11, 1932.     G. W. PIERCE     1,882,395
FREQUENCY INDICATOR
Filed April 23, 1928

Inventor
George W. Pierce
By David Rines
Attorney

Patented Oct. 11, 1932

1,882,395

UNITED STATES PATENT OFFICE

GEORGE W. PIERCE, OF CAMBRIDGE, MASSACHUSETTS

FREQUENCY INDICATOR

Application filed April 23, 1929, Serial No. 272,083, and in Canada December 31, 1927.

The present invention relates to electrical systems and apparatus and more particularly to frequency indicators.

A chief object of the invention is to provide a new and improved frequency indicator.

With this and other objects in view, the invention consists of the improved frequency indicator a preferred embodiment of which is hereinafter described, illustrated in the accompanying drawing and defined in the appended claims.

Figure 1:
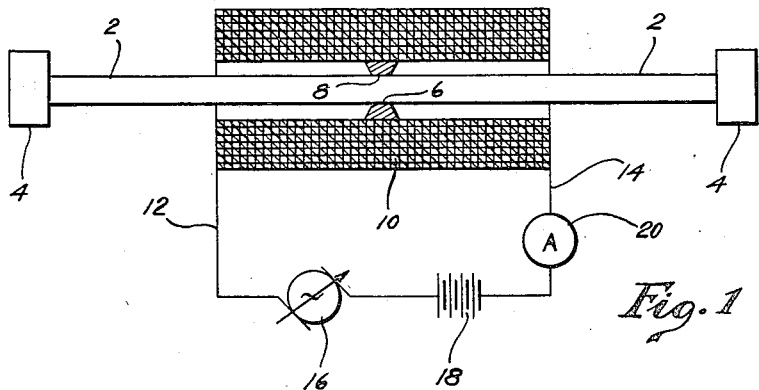
Figure 2:
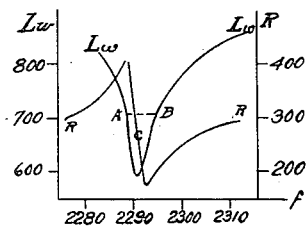
Figure 4:
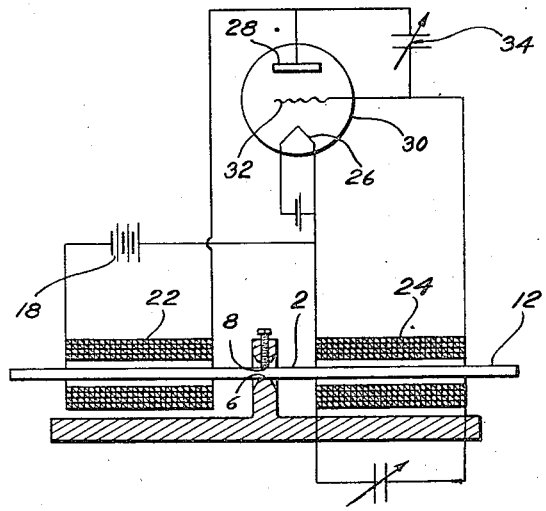
Figure 3:
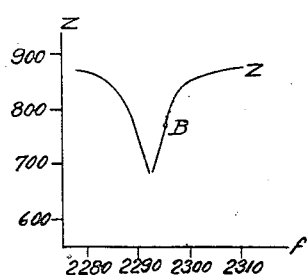

The invention will be explained in greater detail in connection with the accompanying drawing, in which Fig. 1 is a diagrammatic view of apparatus and circuits constructed and arranged to illustrate the principle of the present invention; Figs. 2 and 3 are plots of experimental results; and Fig. 4 is a diagrammatic view similar to Fig. 1 of a modification.

Magnetostrictive vibrators, as is explained in Letters Patent No. 1,750,124, granted March 11, 1930, upon application, Serial No. 158,452, filed January 3, 1927, of which the present application is a continuation in part, are constituted of a magnetostrictive core 2 disposed in an electromagnetic field, such as may be produced by a coil or winding in an electric circuit. When stimulated magnetically by the field, the core becomes slightly mechanically deformed or distorted by magnetostriction. The resulting increment of deformation may be a lengthening, or a shortening, or some other distortion, depending on the material and on the polarity of the increment of the magnetic field. Conversely, when the vibrator is mechanically deformed or distorted, it will react or respond magnetically by magnetostriction with an increment of magnetization depending upon the nature of the preexisting magnetic field and the mechanical deformation. The mechanical deformation is produced by exciting reversible internal stresses in the core, and the core readily recovers upon the withdrawal of the deforming forces.

If the current or voltage is alternating, the electromagnetic field created thereby will also be alternating. The core 2 will, therefore, increase and decrease in length (let us say) many times a second, every variation in the current producing its stimulative effect on the core 2, and every deformation of the core producing its reaction response upon the current. The core 2 will, in consequence, vibrate mechanically by magnetostriction about a nodal point at its center with a period of vibration equal to the period of the alternating electromotive force. Ordinarily, these vibrations will be quite small. When the alternating frequency is close to, or substantially the same as, the natural frequency of mechanical vibration of the core 2, however, the amplitude of vibration of the core, though still small, becomes relatively quite large. The core will then react inductively on the load to render its consumption of power critical as to frequency for frequencies near the free frequency of the core. The mechanical damping of the core, mounted as shown, is as small as possible, with the result that the resonant response of the core is very sharp and pronounced.

To illustrate the principle of the invention, the magnetostrictive core 2 is shown in Fig. 1 driven by a solenoid coil 10 provided with conductors 12 and 14 by which it may be connected, for simplicity, in series with a source of alternating electromotive force, such as an alternating current generator 16. Other, more complicated, sources of alternating current may be used, one of which is illustrated in Fig. 4. A local battery 18 (shown in Fig. 1 in series with the source 16 and the winding 10) applies a steady magnetizing field to the core 2, over which the alternating field produced by the generator 16 is superposed. The alternating field is preferably smaller than the steady field, in order that the combined fields may not, at any time, fall to zero. The battery may be dispensed with, and the core may be magnetized electro-magnetically by a local source, or it may be permanently magnetized, instead, or the battery and a permanently magnetized core may be employed together.

In order not to complicate the showing of Fig. 1, no means are illustrated therein for tuning the circuit or varying the frequency of the alternating current flowing therein, particularly as the core 2 may itself be a tuned element of very low decrement, thereby dispensing with or supplementing electrical tuning of the circuits. An important feature of the invention contemplates the use of a tuned system, as great frequency selectivity is thereby attained, and it will be understood that a tuning condenser or other tuning device may be used to effect this result. If the frequency of the alternating current is varied gradually by this tuning device, or by variation of the speed of the generator, from a value on one side of the natural or resonant frequency of mechanical vibration of the core, to a value on the other side of this frequency, a comparatively intense sound is produced somewhere in this range, if the resonant frequency is within audible limits. If the frequency is outside the audible range, the resonant response is made manifest by a transient sound, or click, in the telephones, or by a change in the reading of an ammeter 20 connected in circuit. This resonant response takes place whenever the tuning of the electromotive force passes through values synchronous with the period of the vibrator, setting the vibrator into violent vibration; or, in more technical language, the approximate equality of the frequency of the applied electromotive force and that of the core is indicated by singular values of the impedance of the system. The invention, therefore, finds application as a very accurate frequency indicator. By filing the resonator down, or adding to its mass by solder or plating, any desired frequency may readily be attained, either high or low, and the frequency indicators calibrated accordingly. Once calibrated by comparison with a standard frequency meter, they will then serve as very accurate frequency indicators themselves. Further illustrations of this operation will appear in connection with a discussion of the other figures of the drawing.

The operation will be better understood in connection with the plot of Fig. 2, showing the relation between the resistance R and the reactance $L\omega$ of the winding 10 for difference frequencies of applied electromotive force in the neighborhood of the natural or free frequency of the core. The axis of abscissæ represents the applied frequency $f$ (number of cycles per second) of the electromotive force, and the ordinate is, in the case of one curve, the reactance $L\omega$, and in the other, the resistance R, both measured in ohms. $\omega$ is an abbreviation for $2\pi f$. The particular core employed in the experiment was of nickel-steel, about 0.92 cm. long, and had a free frequency of fundamental longitudinal vibration of about 2290 cycles per second. As the curves of Fig. 2 clearly show, the reactance $L\omega$ and the resistance R undergo marked effects, the former sinking to a minimum in the neighborhood of the resonant frequency of the core, and the latter at a frequency somewhat greater.

In Fig. 3, the total impedance Z of the winding 10 is similarly plotted against the applied frequency $f$ of the electromotive force. The values of Z shown in this plot were obtained by taking the square root of the sum of the squares of the resistance R and the reactance $L\omega$ of Fig. 2. According to this plot, the impedance Z of the winding 10 is at a minimum at a frequency of about 2291 cycles per second. The ammeter 20 in the circuit of Fig. 1 will therefore indicate a maximum of current when the generator frequency has this value.

In the neighborhood of this resonant frequency, the power output of the generator undergoes a large increase. Assuming, therefore, that the generator is running at a speed a little too slow to give maximum power, and that the generator increases in speed, the draft of power from the generator by the load will increase, and tend to slow the generator down. If, on the other hand, the generator speed tends to decrease, the load will decrease also, and this will tend to maintain the generator speed high. The vibration of the magnetomechanical vibrator thus acts to stabilize the generator, as explained in the said Letters Patent.

Any material having suitable properties may, of course, be used for the vibrating body 2, but it should obviously be constituted of material that is suitably magnetizable. The core may be in the form of a simple rod or tube of the proper material; but to obtain the best results, depending upon the purpose for which the apparatus is used, the core should be characterized by comparatively large magnetostrictive effects and comparatively low vibrational decrement. Such effects exist in magnetic metals and magnetic alloys. Different bodies possess the requisite properties in different degrees. Alloys containing nickel, chromium, cobalt and steel, in proper proportions, have comparatively large magnetostriction. Thus, alloys consisting of iron and chromium, or nickel and chromium, nickel and cobalt, or nickel and iron, also nickel and copper, form very good magnetostrictive vibrators. Alloys of three or more of these elements may also be advantageously employed. Cores of nickel, nickel steel and chrome steel have large magnetostrictive effects. Ordinary metals have their elasticity and density slightly modifiable by changes in temperature. Such temperature changes, therefore, introduce small variations in the natural period of mechanical vibration of such bodies. To obtain substantially constant frequency, it is preferred to utilize a vibrator having a coefficient of the ratio of elasticity to density that varies as little as possible with variations of temperature. Certain alloys of steel, nickel and chromium are known to possess substantially constant coefficients of frequency with variations of temperature. One such alloy, constituted of 52% iron, 36% nickel and 12% chromium, is practically independent of temperature. I have found that a rod of nickel, chromium and steel has a period that is also practically independent of magnetic field strength over wide limits. Annealed rods, according to my experiments, give the best results. For high precision of frequency, the metal should have a high constancy of elasticity.

If the vibrator is in the form of a rod or tube of small diameter, the period of vibration is nearly proportional to the length of the rod or tube. Thus, a rod of nickel-steel, known in the trade as "stoic" metal, having a diameter of one-half centimeter and a length of ten centimeters, has a fundamental period of longitudinal vibration of about 1/21,000 of a second. A rod of the same diameter ten times as long (100 centimeters) has a period about 1/2100 of a second. Rods of the same diameter and the same two respective lengths, but constituted of an alloy of iron and chromium in a particular proportion, have the fundamental periods of 1/27,000 and 1/2700 of a second, respectively. These results are consistent with the fact that the two materials have different elasticities and densities.

The above figures correspond to but a single mode of vibration of the cores. But all vibratory bodies have also additional modes of vibration. In addition to one or more natural fundamental frequencies of mechanical vibration, the core has also frequencies of vibration determined by the operation of the core in halves, thirds, fourths, fifths and other overtones. There will usually, therefore, be more than one specific frequency of magnetization at which the core will resonate as above described. Such other modes of vibration may be produced by particular methods of stimulating the vibrations, or by particular modes of clamping the body. In addition to other modes of longitudinal vibration, there are certain magnetostrictive effects attendant upon the twist or torsion of the cores, particularly if current be sent lengthwise through the core, so that torsional vibrations are also available. All these modes and kinds of vibration may be utilized according to the present invention.

I find that at frequencies as high as 200,000 cycles per second, a solid nickel-steel, nichrome, or chromium-steel rod is highly efficient even when its diameter is as large as 1 inch, and though used in magnetizing coils that have a clearance of more than 1/4 inch all around the rod. By diminishing this clearance and using cores of smaller diameter and shorter lengths, the upper limit of frequency can be greatly raised, and then properly constructed comminuted cores with elastic binding material will serve still further to raise the limit of available frequencies.

It will be noted that when vibrating at its fundamental frequency, the two halves of the centrally supported core are driven by equal and oppositely acting forces, so as to communicate practically no motion to the clamp and its base. The apparatus is, therefore, free from one of the sources of trouble and irregularity of tuning forks, the periods of vibration of which are affected by the table or other support on which they are placed. The centrally supported vibrator of the present invention is not dulled, as is a tuning fork, by its own resonance,—a very important consideration where tuned vibrators are necessary.

So well does the present vibrator balance itself about a central pivot 6 that I find that the clamp 6, 8, shown in Figs. 1 and 4, between which the core is centrally clamped, may be dispensed with and a mere pivot rest 6 take its place, as shown in the before-mentioned Letters Patent, upon which the core freely rests centrally. With this arrangement the frequencies may be changed at will by merely pulling out one core and replacing it by another. The core may be otherwise supported also.

The vibrator may be used as a transformer to couple several circuits together in order to transmit energy from one circuit to another at a given frequency. When an alternating current of the critical frequency flows in one circuit, it will cause the vibrator to vibrate energetically and thus transmit energy to the other circuit. Thus, in the system of Fig. 4, the core 2 is positioned axially of a magnetic field, here shown as produced by coils 22 and 24, and is preferably held in such manner, as by means of the centrally positioned clamps 6 and 8, as freely to vibrate longitudinally about a nodal point at its center. For symmetry, one of the coils is positioned on one side of the middle of the core 2 and the other on the other side. The coils may be compacted near the center of the core, or they may be separated or spread out, each over the whole region of the half-length of the core, or they may be replaced by a single coil. The coil 22 is connected, in series with the local battery 18, between the filament or cathode 26 and the plate or anode 28, in the output or plate circuit of a vacuum tube 30. The coil 24 is similarly connected in the input or grid circuit of the tube, between the filament 26 and the grid or third electrode 32. The coils 22 and 24 thus form electrical paths between the filament and the plate, and between the filament and the grid, respectively. The grid and the plate may, if desired, be spanned by a variable condenser 34; or the tuning condenser may be connected in parallel with one or the other of the coils 22 and 24; or, if the coils are suitably designed, the condenser may be omitted altogether. An electric vacuum-tube oscillator is thus provided, having considerable similarity to oscillators of the prior art. The new oscillator, however, comprises a very important novel feature in the transformer for coupling the input circuit and the output circuit together, and comprising the coils 22 and 24 and the mechanically tuned core of magnetizable material for transforming resonant electric energy and feeding it from the output circuit to the input circuit. This transformation of energy is effected, at constant frequency, through the effects produced by the distortion or deformation of the core, as is explained in the said Letters Patent. The tuning is such that high selectivity of frequency is possible in the transfer of energy from one circuit to another. The local battery 18 may serve to supply the plate current, as well as to polarize the vibrator. For high-frequency oscillations, the winding of one of the coils 22 and 24 may be reversed as compared with the other winding, and as compared with the arrangement of oscillators of this character as usually constructed. The reversal of the coil is not necessary in all cases, but it has the advantage of making the oscillations much larger and more stable and preventing parasitic electric oscillations by electric feed back, and of restricting the oscillations to periods determined by the mechanically-tuned core.

The operation is fully described in the said Letters Patent but, of course, the operativeness of the invention does not depend upon the theories that may be advanced to explain it.

By proper choice of length and other dimensions, as explained in the said Letters Patent, the apparatus is applicable to systems of high or low frequency within a range that may extend from a hundred cycles to hundreds of thousands of cycles.

It will be clear that instead of the fundamental frequency, any harmonic of the resultant electrical oscillations may be utilized; and, vibrations other than the fundamental longitudinal frequency of the core may also be employed.

To persons skilled in the art many modifications of the apparatus will occur, and no effort has here been made to be exhaustive.

What is claimed is:

1. A frequency indicator comprising an alternating-current circuit having a coil, and a magnetostrictive vibrator centrally balanced in the coil adapted to vibrate about its center, the vibrator being adapted to vibrate mechanically by magnetostriction when stimulated magnetically by the electromagnetic field of the coil and to react magnetically through magnetostrictive effects upon the current in the coil when vibrated, and means for indicating the magnetostrictive reaction of the vibrator upon the current in the coil.

2. A frequency-indicating body having magnetostrictive activity, in combination with an exciting circuit therefor, the relation between the body and the circuit being such that the current flowing through the circuit is subjected to the reaction of the body due to magnetostrictive effects, and means for indicating the said reaction in the said circuit.

3. A frequency-indicating body having high magnetostrictive properties and having as its frequency of vibration the frequency of longitudinal vibration, in combination with an exciting circuit therefor, the relation between the body and the circuit being such that the current flowing through the circuit is subjected to the reaction of the body due to magnetostrictive effects, and means for indicating the said reaction in the said circuit.

4. A magnetostrictive frequency-indicating body mounted to vibrate symmetrically about its center, in combination with an exciting circuit therefor, the relation between the body and the circuit being such that the current flowing through the circuit is subjected to the reaction of the body due to magnetostrictive effects, and means for indicating the said reaction in the said circuit.

5. A magnetostrictive frequency-indicating body, in combination with a support upon which it freely rests to vibrate, and an exciting circuit therefor, the relation between the body and the circuit being such that the current flowing through the circuit is subjected to the reaction of the body due to magnetostrictive effects, and means for indicating the said reaction in the said circuit.

6. A frequency indicator comprising a magnetostrictive core capable of resonating to specific fixed frequencies of magnetization, in combination with an exciting circuit therefor, the relation between the core and the circuit being such that the current flowing through the circuit is subjected to the reaction of the core due to magnetostrictive effects, and means for indicating the said reaction in the said circuit.

7. A frequency indicator comprising a magnetostrictive vibrator capable of free mechanical vibration of small decrement, in combination with an exciting circuit therefor, the relation between the vibrator and the circuit being such that the current flowing through the circuit is subjected to the reaction of the vibrator, and means for indicating the said reaction in the said circuit.

8. A frequency indicator comprising a circuit having a source of electric oscillations of variable frequency, a magnetostrictive body connected to said source so as to be excited thereby, the relation between the body and the circuit being such that the current flowing through the circuit is subjected to the reaction of the body due to magnetostrictive effects at a predetermined frequency of the oscillations of the circuit, and means for indicating the said reaction in the said circuit.

9. A frequency indicator comprising a frequency-standard, magnetostrictive vibrator having a natural frequency of mechanical vibration, in combination with an exciting circuit therefor, the relation between the vibrator and the circuit being such that the current flowing through the circuit is subjected to the reaction of the vibrator due to magnetostrictive effects, means for varying the frequency of the current in the circuit so that said frequency will be in substantial resonance with the vibrator, and means for indicating the said reaction in the said circuit.

10. An electric system comprising an electric circuit having a winding for the flow of alternating current and a tuned magnetostrictive vibrator core so associated with the electromagnetic field of the winding that it freely vibrates mechanically by magnetostriction when stimulated magnetically by the said field, and means in the circuit for utilizing the power when the core, freely vibrating mechanically, responds magnetostrictively, rendering the power in the said circuit critical as to frequency for frequencies near the free frequency of the core.

11. An electric system as defined in claim 10 in which the core is freely supported upon a support.

12. An electric system as defined in claim 10 in which the core is centrally supported to vibrate symmetrically about its central support.

13. An electric system as defined in claim 10 in which the winding is connected in circuit with a generator.

14. An electric system as defined in claim 10 in which the core is weighted.

15. An electric system as defined in claim 10 in which the core is polarized.

16. The combination with a circuit having means for producing an alternating magnetic field, of a magnetostrictive vibrator substantially resonant with the said field, the vibrator being so associated with the said field that it freely vibrates mechanically by magnetostriction when stimulated magnetically by the said field, and means in the circuit for utilizing the power when the vibrator, freely vibrating mechanically, responds magnetostrictively, rendering the power in certain parts of the circuit critical as to frequency for frequencies near the free frequency of the vibrator.

In testimony whereof, I have hereunto subscribed my name.

GEORGE W. PIERCE.